United States Patent
Zreiq et al.

(10) Patent No.: US 7,920,520 B2
(45) Date of Patent: Apr. 5, 2011

(54) HANDOFF BETWEEN A SIP NETWORK AND A CELLULAR COMMUNICATION SYSTEM

(75) Inventors: Samer S. Zreiq, Haifa (IL); Baruch Eruchimovitch, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 776 days.

(21) Appl. No.: 11/186,125

(22) Filed: Jul. 20, 2005

(65) Prior Publication Data

US 2006/0120355 A1 Jun. 8, 2006

Related U.S. Application Data

(60) Provisional application No. 60/589,821, filed on Jul. 20, 2004.

(51) Int. Cl.
*G08C 17/00* (2006.01)
(52) U.S. Cl. ........ 370/331; 370/352; 370/328; 455/436; 455/439; 455/444
(58) Field of Classification Search .................. 455/436, 455/439, 444; 370/352, 325, 331
See application file for complete search history.

(56) References Cited

U.S. PATENT DOCUMENTS

| | | | |
|---|---|---|---|
| 6,571,094 B1 | 5/2003 | Begeja et al. | |
| 6,603,968 B2 * | 8/2003 | Anvekar et al. | 455/433 |
| 2002/0141358 A1 * | 10/2002 | Requena | 370/329 |
| 2002/0147008 A1 | 10/2002 | Kallio | 455/426 |
| 2003/0134650 A1 | 7/2003 | Sundar et al. | 455/465 |
| 2004/0072593 A1 | 4/2004 | Robbins et al. | |
| 2004/0087307 A1 | 5/2004 | Ibe et al. | |
| 2004/0137900 A1 | 7/2004 | Varonen et al. | |
| 2006/0205436 A1 * | 9/2006 | Liu et al. | 455/560 |
| 2008/0026740 A1 * | 1/2008 | Netanel | 455/419 |

FOREIGN PATENT DOCUMENTS

| | | |
|---|---|---|
| EP | 1267548 A2 | 6/2002 |
| WO | 9631952 | 10/1996 |
| WO | 01091446 | 11/2001 |
| WO | 03053083 | 6/2003 |
| WO | 03061177 | 7/2003 |
| WO | 03101000 | 12/2003 |

OTHER PUBLICATIONS

International Search Report—PCT/US2005/025810, International Search Authority—European Patent Office—Nov. 30, 2005.
Written Opinion—PCT/US2005/025810, International Search Authority—European Patent Office—Nov. 30, 2005.
International Preliminary Report on Patentability—PCT/US2005/025810, International Search Authority—IPEA/US—Alexandria, Virginia, Jul. 30, 2007.

* cited by examiner

*Primary Examiner* — Patrick N Edouard
*Assistant Examiner* — Justin Y Lee
(74) *Attorney, Agent, or Firm* — Florin Corie (57) ABSTRACT

Handoff between a wireless SIP network and a cellular communication system is provided. A system is designed to provide nomadic cellular services including voice to a SIP-enabled device.

78 Claims, 10 Drawing Sheets

HANDOFF BETWEEN A SIP NETWORK AND A CELLULAR COMMUNICATION SYSTEM

CLAIM OF PRIORITY UNDER 35 U.S.C. §119

The present Application for Patent claims priority to Provisional Application No. 60/589,821 entitled "AUTHENTICATION OF AN IP-ONLY DEVICE INTO A CDMA NETWORK" filed Jul. 20, 2004, and assigned to the assignee hereof and hereby expressly incorporated by reference herein.

BACKGROUND

1. Field

This invention generally relates to wireless communications. More particularly, the invention relates to handoff between a session initiation protocol (SIP) network and a cellular communication system.

2. Background

Table 1 summarizes acronyms and abbreviations.

TABLE 1

| | Acronyms and abbreviations |
|---|---|
| AP | Access Point |
| AKEY | Authentication Key |
| BS | Base Station |
| CDMA | Code Division Multiple Access |
| CFSCNM | Candidate Frequency Search Control Message |
| CFSRSM | Candidate Frequency Search Response Message |
| CFSRQM | Candidate Frequency Search Request Message |
| ESN | Electronic Serial Number |
| EVRC | Enhanced Variable Rate Codec |
| FA | Foreign Agent |
| FFS | For Further Study |
| GPS | Global Positioning System |
| GW | Gateway |
| HLR | Home Location Register |
| HW | Hardware |
| IETF | Internet Engineering Task Force |
| IMSI | International Mobile Subscriber Identity |
| IOS | Inter Operability Specifications or Server |
| IP | Internet Protocol |
| LAN | Local Area Network |
| MAC | Medium Access Control |
| MAD | Mobile Addressed message |
| MGW | Media Gateway |
| MIB | Management Information Base |
| MIN | Mobile Identification Number |
| MIP | Mobile Internet Protocol |
| MO | Mobile Originated |
| MS | Mobile Station |
| MSC | Mobile Switching Center |
| MT | Mobile Terminated |
| NGLAN | Next Generation LAN |
| QAM | Operation Administration Management |
| OAM&P | Operation Administration Management & Provisioning |
| OCS | Obiwan Cellular Server |
| PPP | Point to Point Protocol |
| QoS | Quality of Service |
| RFC | Request For Comments |
| RLP | Radio Link Protocol |
| SGW | Signaling Gateway |
| SIP | Session Initiation Protocol |
| SNMP | Simple Network Management Protocol |
| SS | Supplementary Service |
| SS7 | Signaling System #7 |
| SW | Software |
| TCH | Traffic Channel |
| TCP | Transport Control Protocol |
| UDP | User Datagram Protocol |
| VoIP | Voice Over IP |
| VOPS | Voice Optimized Power Save |
| WAN | Wide Area Network |
| WSS | Wireless Soft Switch |

SIP-only devices do not have a cellular identity and cannot be granted cellular access without a cellular identity. Thus, there is a need for internetworking SIP-only devices with a cellular network.

One solution has been to statically allocate a cellular identity to every SIP-only device that is planned to have access to a cellular network. This is none standard solution requires changes to the standard SIP protocol in the SIP devices.

In another solution, when a SIP device calls a cellular device, the call can be routed through the public telephony network (PSTN) and in the PSTN the call is routed to a cellular network. This solution introduces extra signaling and traffic overhead which affects the voice quality of the calls. It also introduces extra charges since the call is routed through the PSTN and PSTN operators charge for the call.

Thus, there is a need for a solution that does not require changes to the standard SIP protocol and that does not involve extra signaling and traffic overhead.

DESCRIPTION

In an embodiment, handoff between a SIP network and a cellular communication system is provided.

In an embodiment, a wireless unit is a Session Initiation Protocol (SIP) device. A wireless unit can also be called a subscriber station, subscriber unit, mobile station, mobile, remote station, remote terminal, access terminal, user terminal, user agent, or user equipment. A wireless unit may be a personal digital assistant (PDA), a handheld device having wireless connection capability, or other processing device connected to a wireless modem.

Architecture

In accordance with an embodiment, an IP (SIP) network is coupled to a cellular (CDMA) network using a special base station (or Gateway), referred to as an SIP/IOS gateway.

Hybrid cellular mobile devices (that support SIP as well), can be granted service in the IP network, while the SIP/IOS GW translates between SIP and CDMA protocols and passes the messages between the two networks. Such hybrid devices have cellular numbers (IMSI and ESN) as well as security parameters that enable the cellular network to authenticate these devices.

In this solution, SIP-only devices are presented as "real" cellular devices to the cellular network. When such a device accesses the cellular network, the SIP/IOS GW along with an AAA server will assign a cellular identity (IMSI, ESN and security parameters) to that device, and pass the cellular identity to the cellular network.

Figure 1:
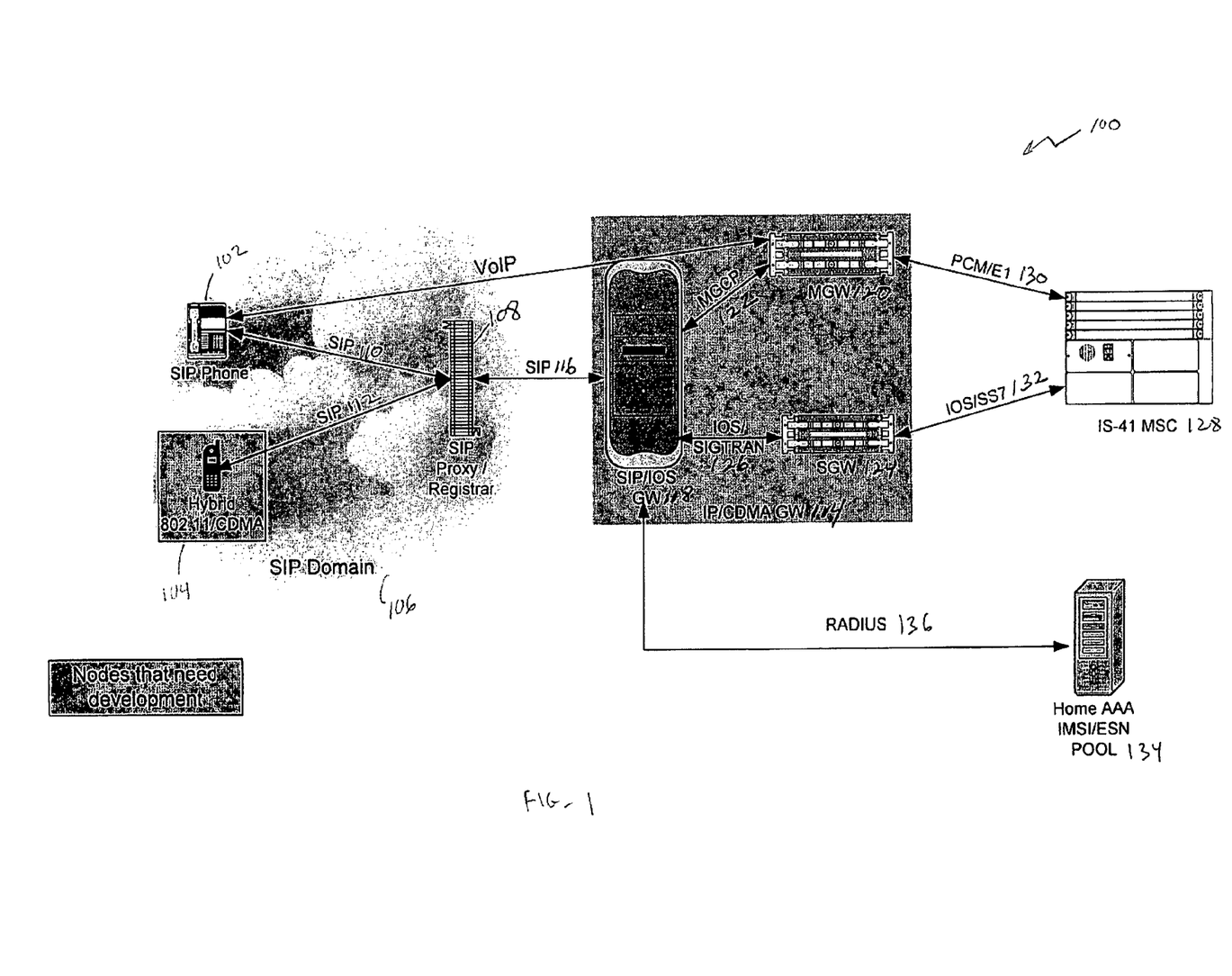
FIG. 1 is a general system architecture in accordance with an embodiment.

A general system architecture in accordance with an embodiment is shown in FIG. 1. FIG. 1 presents an overall view of an IP-BSC interworking architecture 100 in accordance with an embodiment. These enabling functionalities include the reuse of CDMA subscription, system selection, single authentication mechanism, call routing and service access, as well as end user charging.

A SIP phone 102 and a hybrid 802.11/CDMA phone 104 are shown in a SIP domain 106 communicating wirelessly with an SIP proxy/registrar 108 via SIP 110, 112. The SIP phone 102 is also configured to communicate with a Media Gateway 120 via voice over Internet Protocol (VoIP). Next Generation LAN (NGLAN) is another name to describe a SIP network 106 that is coupled to a cellular operator.

The SIP proxy/registrar 108 communicates wirelessly with an IP/CDMA gateway 114 via SIP 116. In particular, the SIP proxy/registrar communicates wirelessly with an SIP/IOS gateway 118 of the IP/CDMA gateway 114.

The SIP/IOS gateway 118 communicates with a Media Gateway 120 via MGCP 122 in accordance with an embodiment. The SIP/IOS gateway 118 communicates with a Signaling Gateway 124 via IOS/SIGTRAN 126. The SIP/IOS gateway 118 communicates with a Home AAA IMSI/ESN pool 134 via RADIUS 136.

The Media Gateway 120 communicates with an IS-41 MSC 128 via PCM/E1 130 in accordance with an embodiment. The Signaling Gateway 124 communicates with an IS-41 MSC 128 via IOS/SS7 132. It would be apparent to those skilled in the art that the MSC 128 may be another kind of CDMA MSC and is not limited to an IS-41 MSC.

When a SIP user logs into the system with a SIP-only device 102, the AAA 134 authenticates the user's account by the user name and password. The GW 114 and AAA 134 may allocate static cellular identities to certain SIP users (VIP users for example) at the login/registration time, and may dynamically allocate cellular identities to other SIP users when the users attempt to make a call to the cellular network, in accordance with an embodiment.

When static IDs are allocated to certain users, mobile terminated call (from the cellular network) can be managed to these users using their static cellular numbers.

In accordance with an embodiment, a SIP provider (that can be an enterprise for example) may purchase a "service package" from the cellular operator that contains a defined number of cellular identities.

The cellular operator configures the AAA 134 with the user accounts that are served by the SIP operator and will be granted access to the cellular network. The AAA 134 will also be configured with the cellular identities that will be allocated to the SIP users (dynamically or statically, as mentioned above). The AAA server 134 logs SIP accounts activities to be supplied by the cellular operator to the SIP operator for billing purposes.

Handoff

In an embodiment, a cellular number works on either a CDMA network or an NGLAN. The core network is smart enough to deliver service either on the NGLAN or on the CDMA network.

In an embodiment, handoffs occur in idle mode or an active mode. In idle mode as the mobile moves between networks, the core network knows how to get to the mobile. Active mode supports NGLAN to CDMA handoffs.

In an embodiment, there are two numbers for the two networks. There is a number for the CDMA network and a number for the NGLAN. Both the NGLAN and CDMA networks can be monitored simultaneously.

NGLAN service is delivered using NGLAN. In an embodiment, an outgoing service is configured to use a preferred access.

In an embodiment, IDs are allocated dynamically for native IP devices in the CDMA domain. IMSI and ESN are allocated from a pool managed by a central server, such as a Home AAA server 134, to every native IP device when attempting to originate a call to a CDMA device. IDs are also allocated to SIP calls. Multiple calls from the same originator are available. Originators are identified by their SIP URL and SIP Call-ID.

In an embodiment, IDs are allocated statically for native IP devices in the CDMA domain. IMSI and ESN are allocated for every device (or part of the devices) in the IP domain when registering in the SIP domain. IP devices are identified by their SIP URL. Multiple calls from the SIP device to the CDMA network are not available.

It would be apparent to those skilled in the art that SIP can be exchanged with any other signaling protocol.

No changes to an 802.11 PHY or MAC layers are needed to implement SIP to CDMA handoffs. Billing records are consistent with cellular. AKEY, ESN and IMSI are used for authentication. RADIUS is for data authentication.

The look and feel of SMS integration and supplementary services support are preserved. There is seamless service availability due to simultaneous monitoring of networks, the SIP network and the CDMA network.

In an embodiment, handoff trigger and target selection are supported. In an embodiment, handoff occurs within 80 seconds and the target of a handoff is determined in 20 milliseconds.

In an embodiment, sleep modes between 802.11 and CDMA are coordinated.

Figure 2:
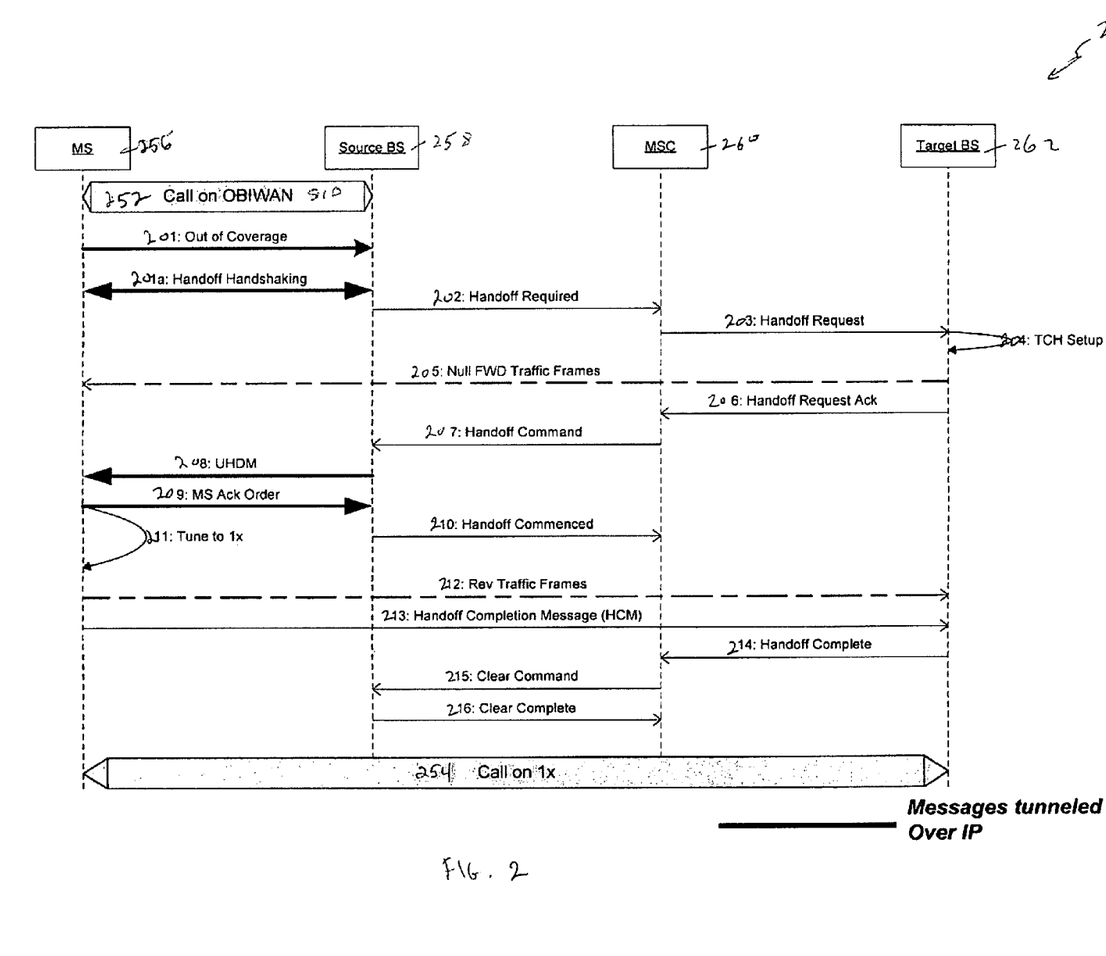
FIG. 2 shows a handoff call flow in accordance with an embodiment.

FIG. 2 shows a handoff call flow 200 in accordance with an embodiment. FIG. 2 shows a call on SIP 252 and a call on CDMA 1x 254. An mobile station (MS) 256, a source base station (BS) 258, a mobile switching center (MSC) 260, and a target BS 262 are only shown.

The MS 256 sends a message to the source BS 258 indicating that the MS 256 is out of coverage 201. Then, handoff handshaking 201a occurs between the MS 256 and the source BS 258.

The source BS 258 sends a handoff required message 202 to the MSC 260. The MSC 260 sends a handoff request message 203 to the target BS 262. The target BS 262 does a traffic channel (TCH) setup 204.

Null forward traffic frames 205 are sent from the target BS 262 to the MS 256. A handoff request acknowledgment 206 is sent from the target BS 262 to the MSC 260. A handoff command 207 is sent from the MSC 260 to the source BS 258. An update handoff direction message (UHDM) 208 is sent from the source BS 258 to the MS 256. An MS acknowledgement order 209 is sent from the MS 256 to the source BS 258. A handoff commenced message 210 is sent from the source BS 258 to the MSC 260. The MS 256 tunes 211 to 1x in accordance with an embodiment. Reverse traffic frames 212 are sent from the MS 256 to the target BS 262.

The MS 256 sends a handoff completion message (HCM) 213 to the target BS 262. The target BS 262 sends a handoff complete 214 to the MSC 260. The MSC 260 sends a clear command 215 to the source BS 258. The source BS sends a clear complete 216 to the MSC 260.

Figure 3:
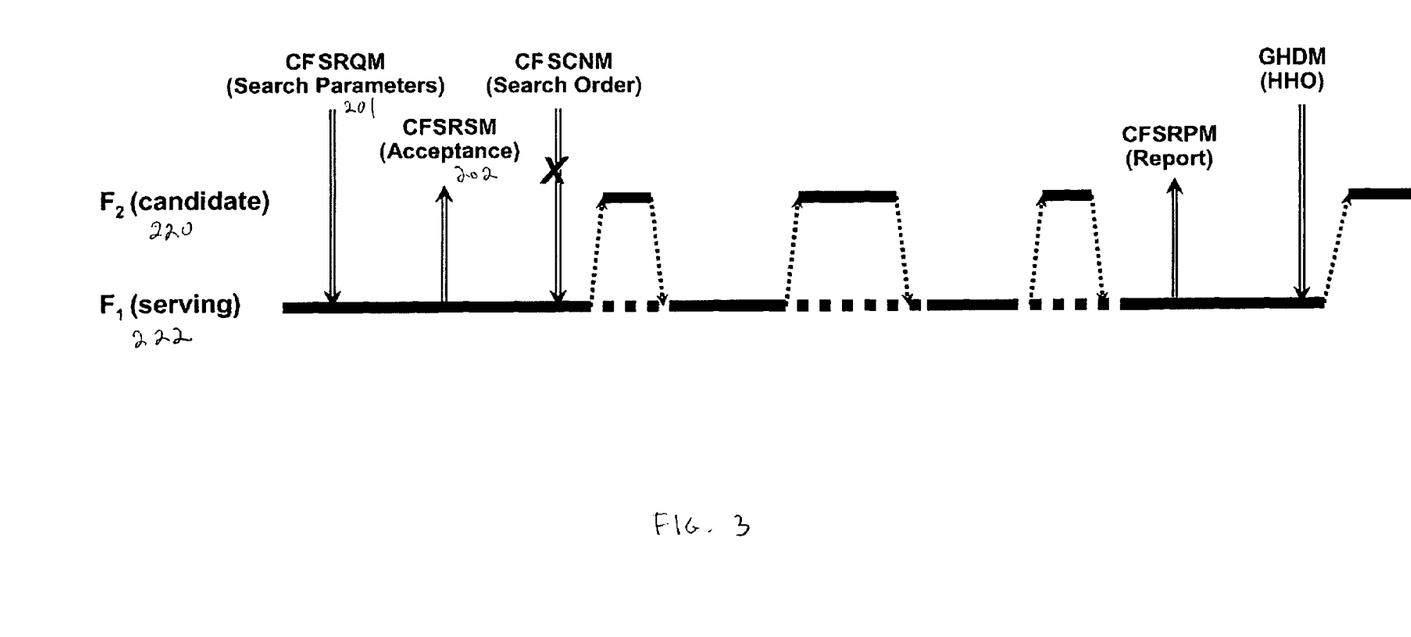
FIG. 3 shows an interaction between a serving mobile station and a candidate base station in accordance with an embodiment.

FIG. 3 shows an interaction during handoff handshaking between a serving MS and a candidate base station in accordance with an embodiment. A search parameters message (CFSRQM) 201 is sent from a BS to an MS 222. An acceptance message (CFSRSM) 202 is sent from the MS 222 to a candidate base station 220.

The CFSRQM is a Candidate Frequency Search Request Message where the base station informs the MS about:
 Candidate Frequency Neighbor List (CFNL)
 Candidate Frequency Search Set (CFSS), a subset of CFNL
 Frequency band and channel number
 Search period for periodic search
 Thresholds (MS Rx power and total pilot $E_c/I_0$, etc.)
 Can specify a search for AMPS (other formats can be added)
 Optionally, can synchronize timing between MS and BS
 The CFSRQM can also start a search.

The CFSRSM is a Candidate Frequency Response Message wherein the MS replies to the CFSRQM:
 Dead time to search entire CFSS (forward and reverse)
 Dead time per visit to candidate frequency (forward and reverse)
 Dead time can be specified in frames in one embodiment or in 1.25 ms slots in another embodiment.

A search order (CFSCNM) does not need to be sent from a BS to the serving MS 222. The CFSCNM is a Candidate Frequency Search Control Message to start and stop searches (periodic or single). The serving MS 222 communicates with candidate base stations 220.

The serving MS 222 sends a report (CFSRPM) to candidate base stations 220. CFSRPM is a Candidate Frequency Search Report Message, wherein the MS reports to a BS on the serving frequency:
 MS Rx power on candidate frequency
 Pilots above add threshold (T_Add)
 Sent in periodic search only if total $E_c/I_0$ of candidate frequency search set is above threshold
 All pilot measurements have to be made within 0.8 seconds of the report.

A General Handoff Direction Message (GHDM) is sent the serving MS 222, the GHDM including flags to specify procedure upon hard handoff (HHO) failure.

Call Setup

Figure 4:
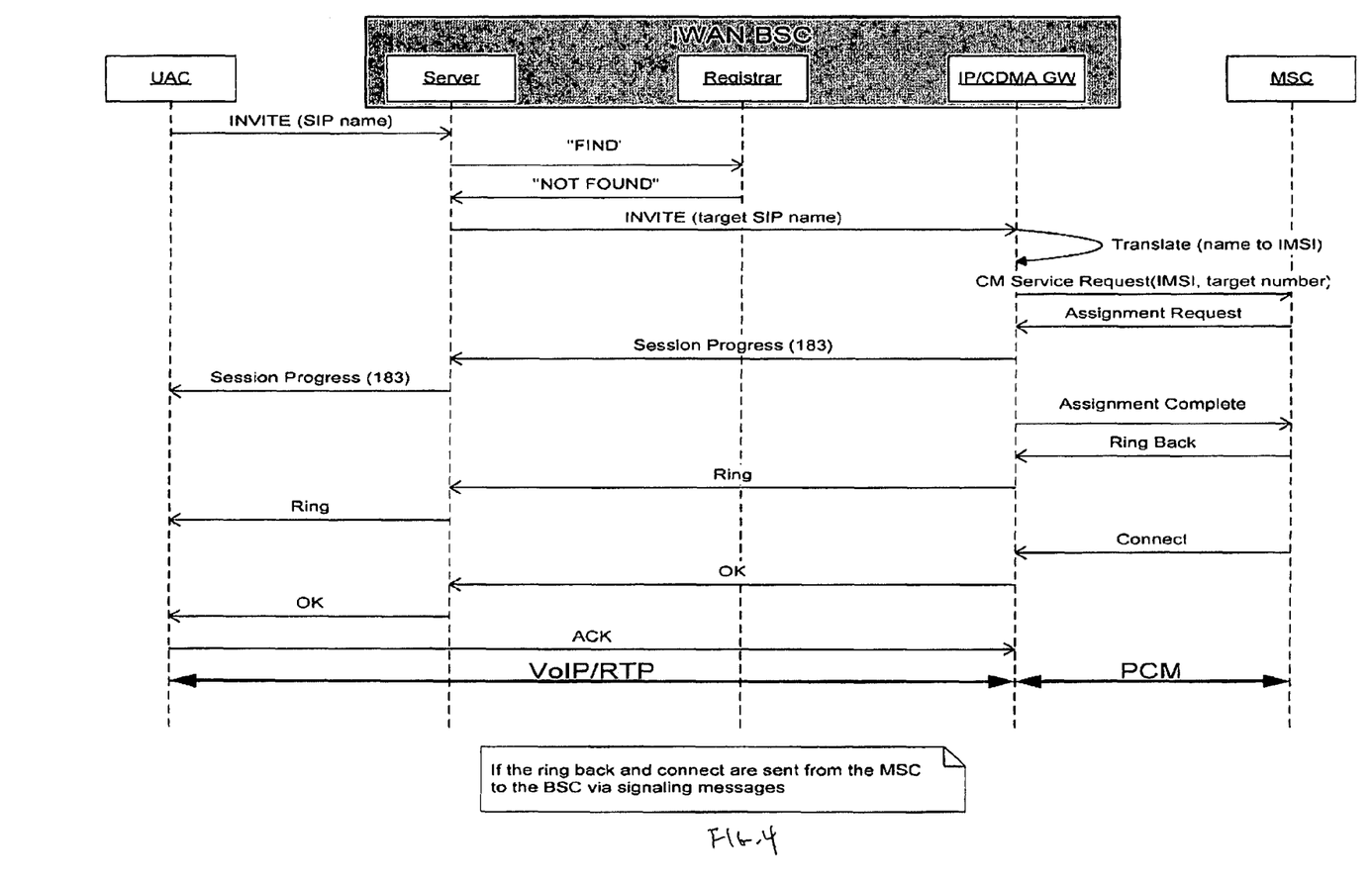
FIG. 4 shows a mobile originated call setup in accordance with an embodiment.

FIG. 4 shows a mobile originated call setup in accordance with an embodiment.

Figure 5:
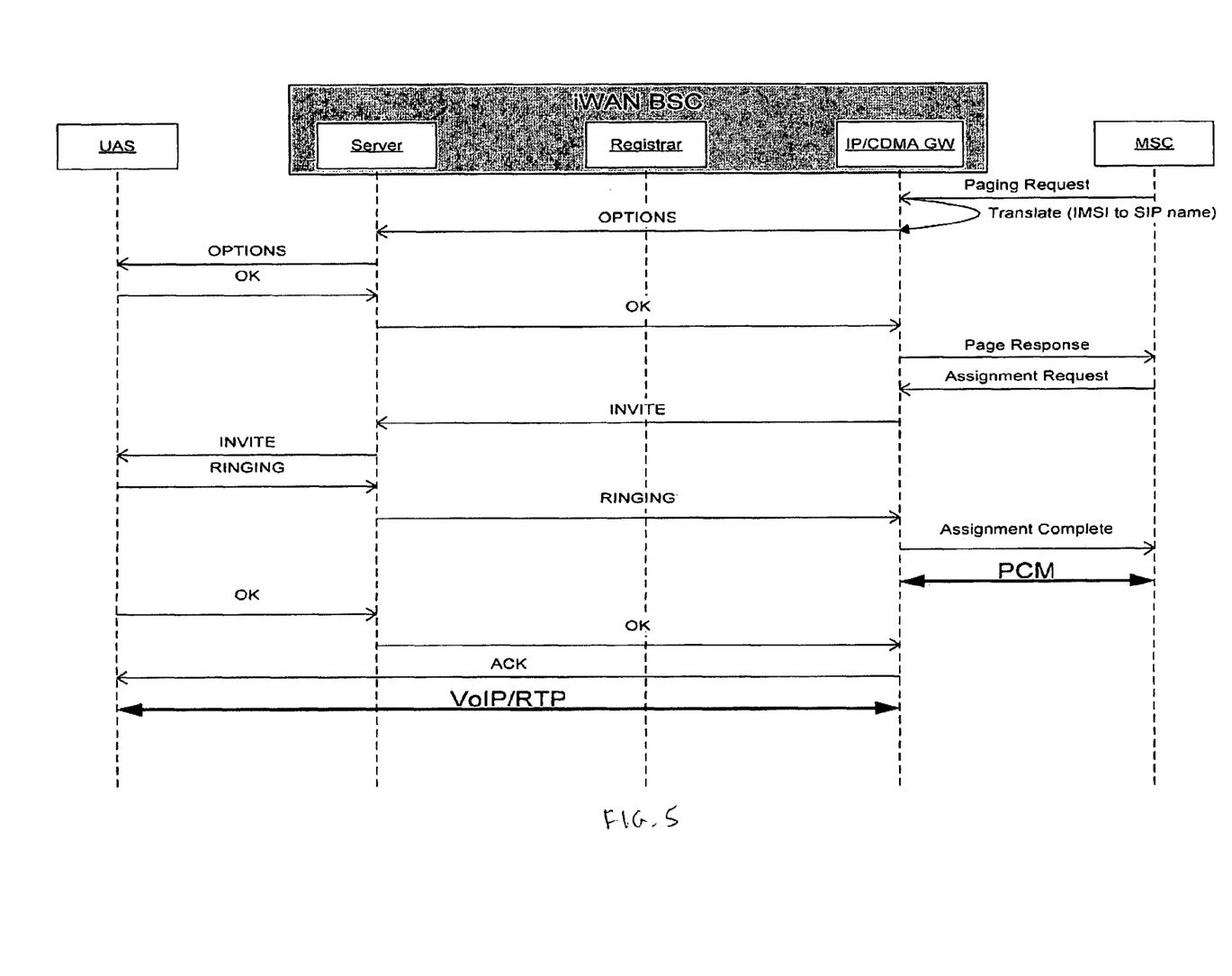
FIG. 5 shows a mobile terminated call set up in accordance with an embodiment.

FIG. 5 shows a mobile terminated call set up in accordance with an embodiment.

Figure 6:
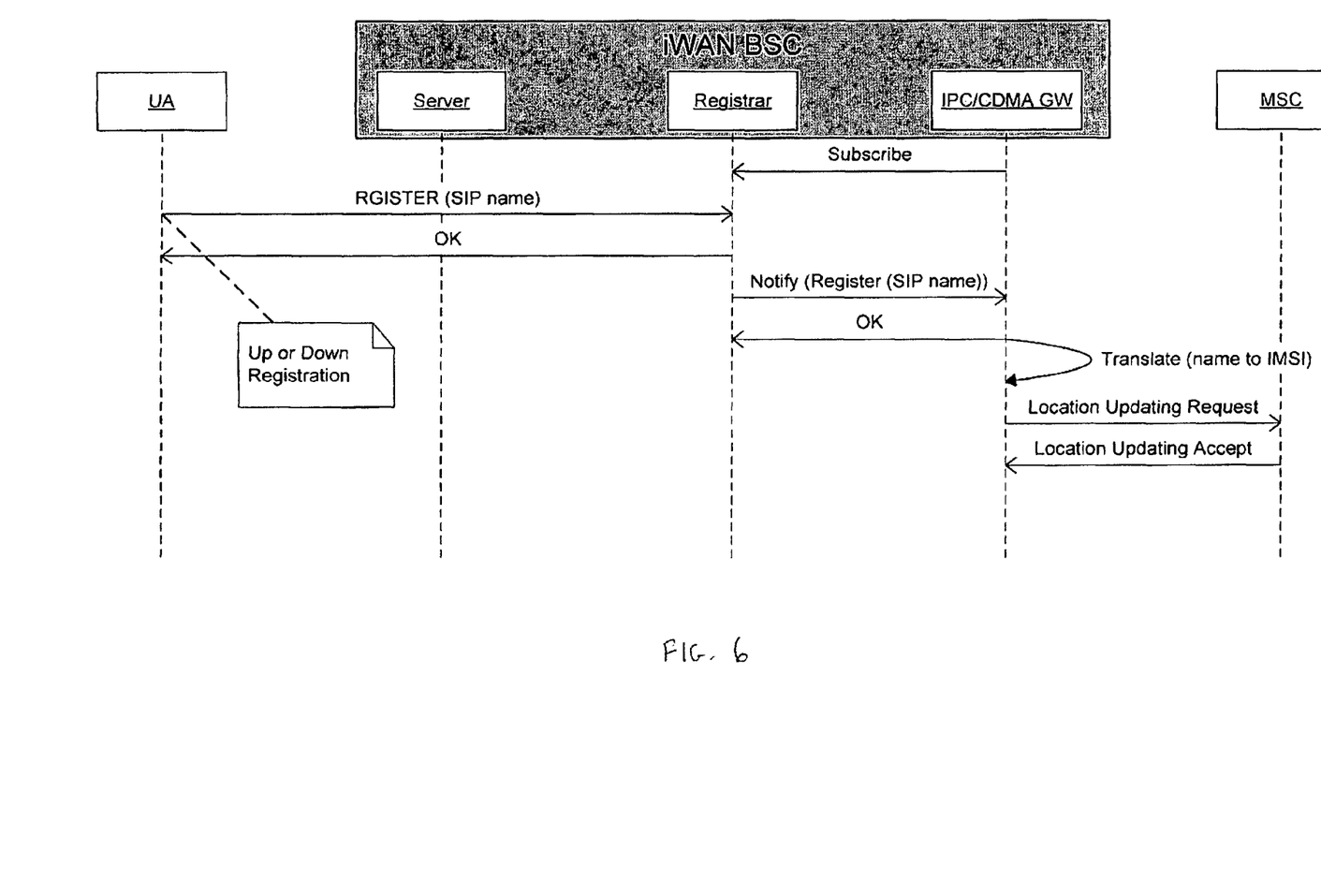
FIG. 6 shows a sequence of events for the handoff procedure.

FIG. 6 shows a registration procedure in accordance with an embodiment.

SMS

For hybrid devices that support SMS, SMS messages are tunneled in SIP extended messages. For native SIP devices, the IP/CDMA gateway is used as an SMS proxy. The IP/CDMA gateway handles the SMS protocol and sends text in SIP messages.

Figure 7:
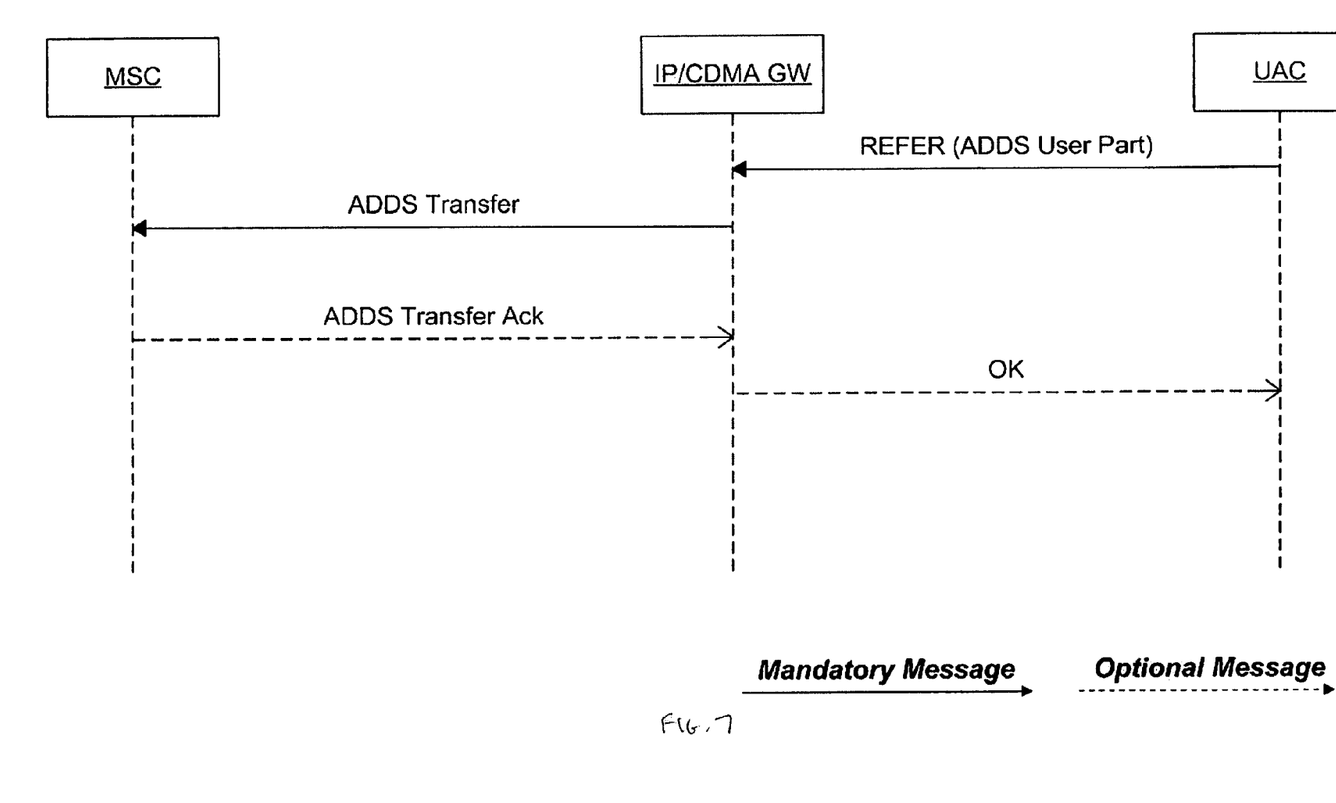
FIG. 7 shows a mobile originated SMS (no call) in accordance with an embodiment.

FIG. 7 shows a mobile originated SMS (no call) in accordance with an embodiment.

Figure 8:
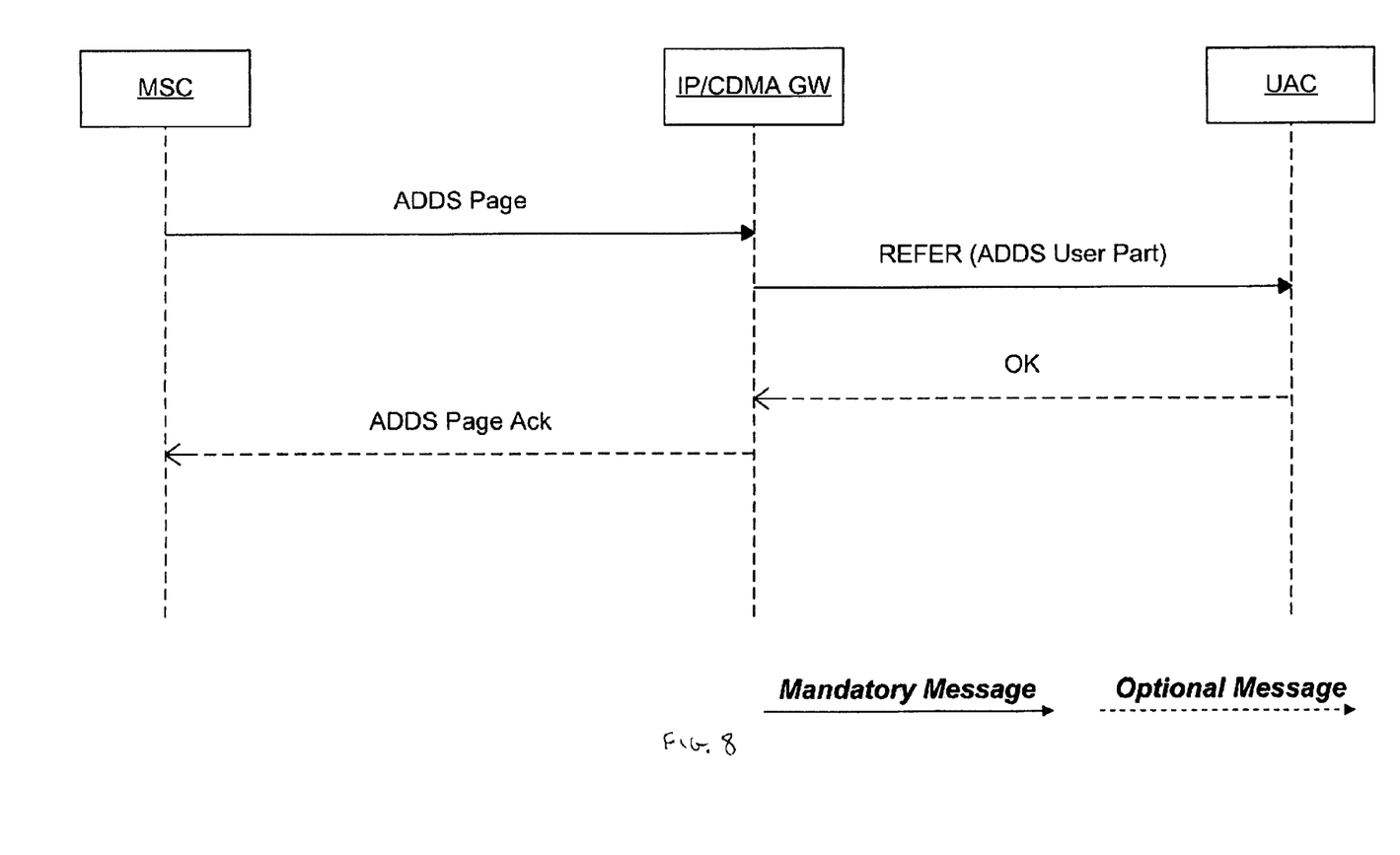
FIG. 8 shows a mobile terminated SMS (no call) in accordance with an embodiment.

FIG. 8 shows a mobile terminated SMS (no call) in accordance with an embodiment.

Figure 9:
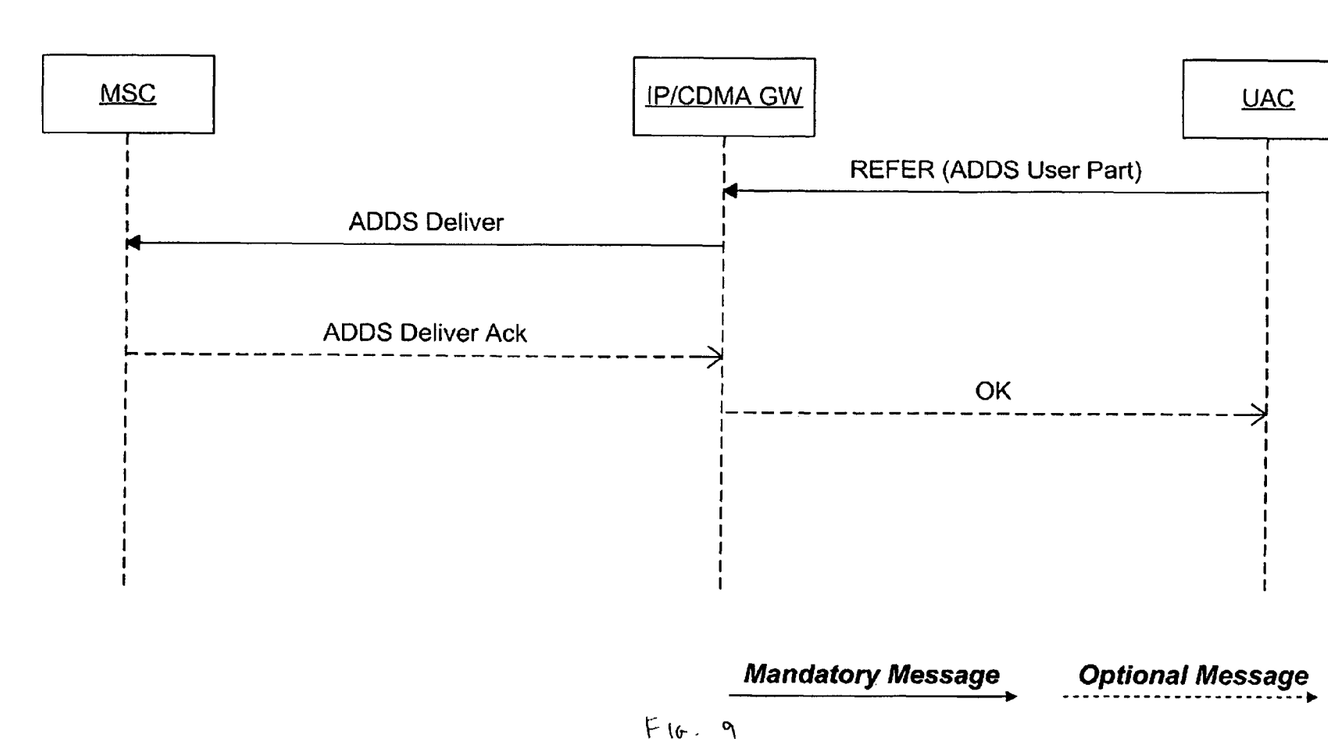
FIG. 9 shows a mobile originated SMS (during calls) in accordance with an embodiment.

FIG. 9 shows a mobile originated SMS (during calls) in accordance with an embodiment.

Figure 10:
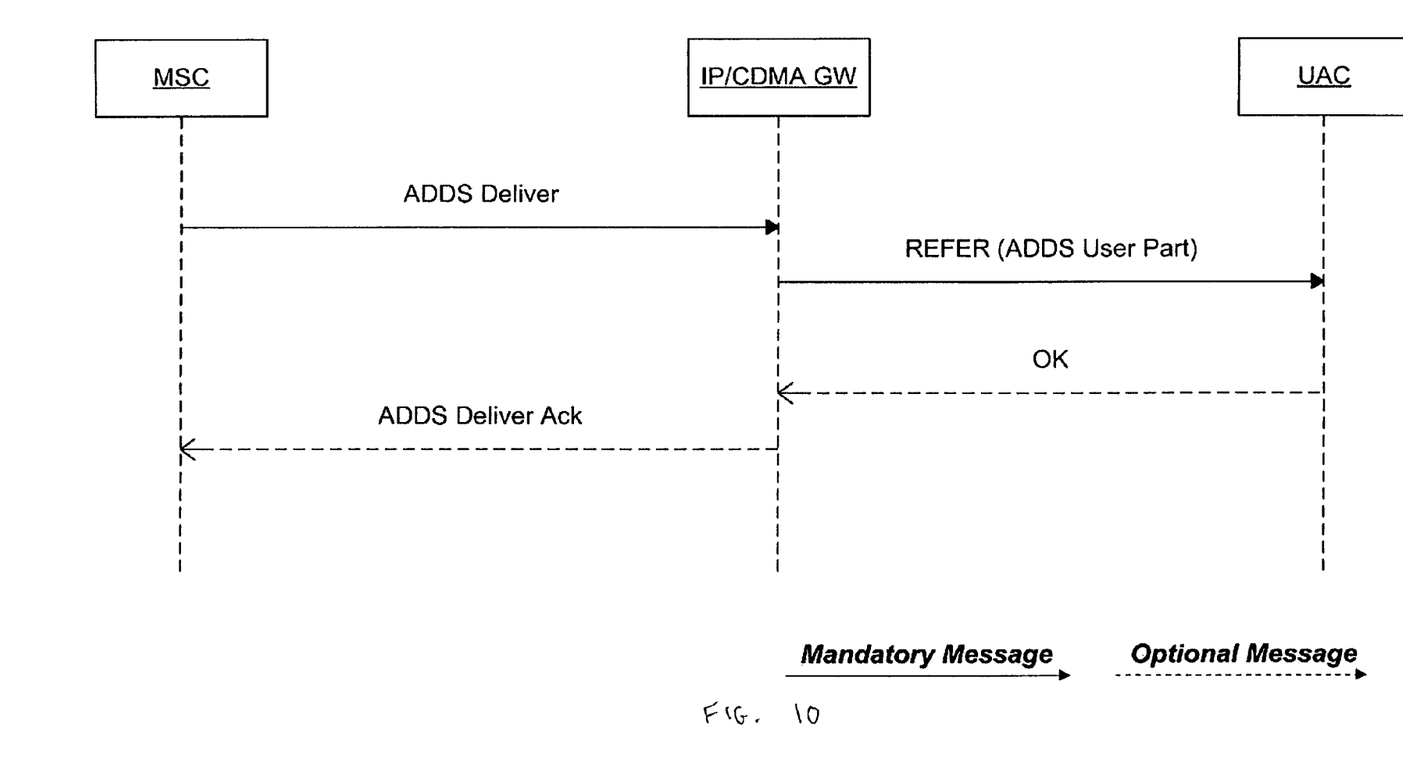
FIG. 10 shows a mobile terminated SMS (during calls) in accordance with an embodiment.

FIG. 10 shows a mobile terminated SMS (during calls) in accordance with an embodiment.

In an embodiment, the SIP/IOS gateway is a special kind of BSC that supports the Standard Inter Operability Specifications (IOS) 4.2 A1 and A2 interfaces, for example. The SIP/IOS gateway is deployed in the operator's network and provides the support for a client in a wireless unit to provide cellular services.

The SIP/IOS gateway is responsible of translating between SIP and IOS protocols. It functions as a SIP Server for the wireless unit and as a CDMA BSC for the MSC. A SIP Registrar is used to register users in the SIP/WLAN domain. The SIP Registrar maintains the translation between IMSI/ESN and the IP address for each user in the SIP/WLAN domain.

The media gateway (MGW) and the signaling gateway (SGW) are controlled by the SIP/IOS gateway and are used to communicate with the MSC using A1/SS7/T1/E1 for signaling and over A2/T1/E1 for voice transfer. The Signaling Gateway translates between SIGTRAN (IP) and SS7, and the Media Gateway includes vocoders, and it translates between EVRC/RTP and PCM/T1/E1.

The network includes an MSC (Soft-Switch) to provide services to wireless terminals in SIP/WLAN mode. This MSC supports standard IOS A1 and A2 interfaces towards the MGW. This MSC is also connected to an IS-41 network for handoffs to the CDMA radio network.

In an embodiment, the SIP/IOS gateway 118 (with the SGW) 204 translates between SIP/IOS and IOS/SS7 protocols.

Subscription Management

Primarily the cellular subscription will be used to manage services. This implies that the cellular ESN and IMSI along with AKEY will be used.

A SIP capable terminal, when operating in the WLAN environment, will use SIP for call processing signaling. It will tunnel the cellular subscription using SIP signaling infrastructure.

In an embodiment, the IP/CDMA GW 114 will store the mapping between an internet address (TCP/IP address and port or UDP/IP address and port) and the cellular subscription in persistent redundant storage.

Handoff Trigger

Handoff occurs when the quality of the link between the wireless terminal and the SIP/IOS GW 118 is unsuitable. Note that a trigger does not always result in a handoff. The handoff outcome depends on the search stage.

Search: The wireless terminal will search for new access points (APs), and will select the AP with the strongest signal strength. An access point is a base station or a gateway.

Handoff will be initiated if this AP is better than the current AP by more than a hysteresis level. (This is to prevent a ping-pong effect). Note that part of the search stage may occur before the handoff trigger, through the construction of a candidate AP list (in cooperation with a database at the IP/CDMA GW).

Completion: The wireless terminal sets up a connection with the new AP. This includes 802.11 authentication, 802.11 association and higher layer functions.

Inter-AP handoff is mobile controlled as in 802.11 systems (as opposed to the mobile assisted handoff that is commonly used in cellular handovers).

A step in handoff is the generation of a handoff trigger that essentially says that the quality of the current link is unsuitable. Based on the handoff trigger, handoff is executed to a CDMA network or to another AP. The handoff execution itself depends on a list of candidate AP's that is maintained at the wireless terminal. The final step in handoff is the execution of handoff, which involves the setup of a new voice path, and the termination of the old voice path.

Handoff Execution

Talk Mode Handoff Execution: Based on entries for each candidate, the candidate AP list is sorted. If the signal strength of the AP on top of the list is sufficient, handoff is attempted to the AP on top of the list. If handoff fails, the wireless terminal tries to link with the next AP on the candidate list, and continues this process until a timer expires, or a maximum number of handoff attempts have been made.

Idle Mode Handoff Execution

The wireless terminal exits the 802.11 power save mode, and scans all channels valid for the operating regulatory domain to construct a candidate AP list, and sorts the list according to rules. If handoff fails, the wireless terminal tries to link with the next AP on the candidate list, and continues this process until a timer expires, or a maximum number of handoff attempts have been made. The wireless terminal sends a keep alive upon completing every handoff. This keep alive includes the time taken for handoff completion, and is used by the IP/CDMA GW to refresh its database. After handoff is complete (successful exchange of messages with the IP/CDMA GW), the wireless terminal switches back to 802.11 power save mode. The exact mechanism for handoff depends on the level of security implemented in a WLAN deployment.

Handoff With No Security

First consider the simplest case, where no security settings or only WEP security settings are used. For these simple cases the process of handoff comprises the following steps Send authentication request, get authentication response. This is the stage where the WEP key, if assigned, is used. A wireless terminal gets the WEP key from the IP/CDMA GW database or a local database at the wireless terminal.

Send association request, get association response.

Use inter-AP protocol to inform old AP to remove wireless terminal from its list Use SNAP to inform the switch at the AP subnet to send packets for wireless terminal to the new AP Handoff With Security Security is implemented using the 802.1x standard that specifies the operation of EAP (extended authentication protocol) over 802 networks.

802.11 to 1x Handoff in Voice Mode

An active state handoff features a handoff from 802.11 operation mode to native 1xRTT mode.

Deciding Between Inter-AP and CDMA Handoffs

When the current AP has low signal strength, we need to decide whether to handoff to a CDMA network or WLAN. For example, in a home WLAN (with only one AP), attempting to handoff to an alternate AP will result in additional delay, and handoff to a CDMA network is attempted as soon as the WLAN link degrades in accordance with an embodiment. On the other hand, in an enterprise deployment, there are likely to be many AP's and handoff to an alternate AP should be attempted before handoff to a CDMA network is attempted.

In case scanning performed during the call (or before the call began) indicates that no other AP's are available, the decision between WLAN and CDMA is clear, and handoff must be to CDMA. However, when other AP's are present, we need to decide whether to handoff to WLAN or CDMA. This decision is important because:

Handoff to WLAN maximizes free spectrum usage

Handoff to WLAN may cause excess delay if a new IP address needs to be obtained or if WLAN deployment results in excessive delay.

The IP/CDMA GW database helps the wireless terminal decide if handoff should be to WLAN or CDMA. Talk mode WLAN to CDMA handoff is attempted if there is a trigger for WLAN to CDMA handoff, or if there is no reliability level 4 AP with signal strength above a threshold.

WLAN to CDMA Handoff Basics

Prior to the handoff, the user terminal employs a SIP over IP over 802.11 protocol stack in the signaling plane, as well as a VoIP stack in the traffic plane. After the handoff procedure is completed, the user terminal employs a native IS-2000 1xRTT signaling protocol stack in the signaling plane, as well as a native IS-2000 1xRTT voice processing at the traffic plane.

The target CDMA BTS, target CDMA BSC and target IS-41 MSC are standard components. The IP/CDMA GW interaction with the IS-41 MSC throughout the handoff procedure complies with the IS-41 and IOS specifications. Development is only allowed and required at the IP/CDMA GW and at the user terminal.

During a voice call in 802.11 operation mode, the wireless terminal should monitor both networks (802.11, CDMA). If the reception power of the 802.11 falls below a certain threshold, the wireless terminal should report the reception power of both networks to the IP/CDMA GW. The IP/CDMA GW may then invoke intersystem handoff procedure to CDMA. Hence, this handoff procedure is mobile assisted. As part of this procedure, the IP/CDMA GW should forward the Handover Command that is received from the IS-41 MSC to the user terminal. The user terminal should then terminate its operation in 802.11 operation mode, tune to 1xRTT mode, kick start its CDMA protocol stack into Active mode and perform the standard CDMA handoff sequence together with the target base station.

Handoff from WLAN to CDMA can occur in two cases: when there is a trigger for WLAN to CDMA handoff, or when inter-AP handoff fails, resulting in a request for handoff to a CDMA network.

The trigger for WLAN to CDMA handoff is generated when any of the following conditions are met.

No packets are received on the downlink for Handoff_Timeout_Threshold

The fraction of missed packets on the downstream exceeds Handoff_PacketLoss_Threshold.

Separate RF chain and firmware will be used by the user terminal for each operation mode (802.11, CDMA). During an 802.11 call, the user terminal should periodically monitor both the 802.11 and the CDMA networks, using the separated hardware. The wireless terminal should attempt to acquire the Pilot Channel of a CDMA system. Following the first Pilot channel acquisition, the wireless terminal should also acquire the associated Synch and Paging channels, to obtain timing information, SID and NID pair, Neighbor List message and the BASE_ID for the CDMA system. Subsequently, the wireless terminal should remain in a reduced flavor of the CDMA Idle state with Slot Cycle Index zero and perform idle mode handoffs to the neighbor cells when needed. The wireless terminal should maintain a list of the 4 strongest Pilot channels received and their associated PN offset, receive power and BASE_ID.

The IP/CDMA GW may reside in a distant location than the target CDMA cell for the handoff. As a result and unlike native CDMA, the IP/CDMA GW is unable to determine the unique identification of the target CDMA cell, based on PN offset alone. The wireless terminal should therefore acquire the Paging channel of the target cell and obtain the BASE_ID from the System Parameters message. To reuse standard CDMA design and implementation, the wireless terminal should remain in the flavor of the idle state mentioned above. This may cause a small waste of battery consumption, but simplifies the implementation significantly.

The invention claimed is:

1. A method of assigning a cellular identity to a session initiation protocol (SIP) device, comprising:
   determining whether the device is one of a SIP-only device operating with a SIP protocol and lacking a cellular identity or a hybrid device;
   authenticating the SIP-only device based on determining that the device is a SIP-only device and that the SIP-only device corresponds to a SIP user account of a SIP provider associated with the SIP-only device; and
   assigning a cellular identity to the SIP-only device based on the authenticating, wherein the assigning further comprises selecting one of a defined number of cellular identities obtained from a cellular operator by the SIP provider associated with the SIP-only device;
   wherein the assigning is performed dynamically upon attempting to originate a call to a cellular network by the SIP-only device.

2. The method of claim 1, further comprising granting access to a cellular network corresponding to the cellular operator using the cellular identity.

3. The method of claim 2, further comprising logging activities of the SIP-only device on the cellular network in the SIP user account.

4. The method of claim 2, wherein the access is granted without changes to the PHY layer or MAC layer operations of the SIP protocol.

5. The method of claim 1, wherein the assigning further comprises statically assigning the cellular identity upon registration in a SIP domain and based on a SIP user identity corresponding to the SIP-only device.

6. The method of claim 1, wherein the cellular identity is available for multiple calls.

7. A method of wireless communication from a session initiation protocol (SIP) device to a CDMA network, comprising:
   determining whether a device is one of a SIP-only device operating with a SIP protocol and lacking a cellular identity or a hybrid device;
   authenticating the SIP-only device based on determining that the SIP-only device corresponds to a SIP user account of a SIP provider associated with the SIP-only device;
   assigning a cellular identity to the SIP-only device based on the authenticating, wherein the assigning further comprises selecting one of a defined number of cellular identities obtained from a cellular operator by the SIP provider associated with the SIP-only device; and
   tunneling SIP text within SMS messages to the CDMA network;
   wherein the assigning is performed dynamically upon attempting to originate a call to a cellular network by the SIP-only device.

8. The method of claim 7, further comprising granting access to a cellular network corresponding to the cellular operator using the cellular identity.

9. The method of claim 8, further comprising logging activities of the SIP-only device on the cellular network in the SIP user account.

10. The method of claim 8, wherein the access is granted without changes to the PHY layer or MAC layer operations of the SIP protocol.

11. The method of claim 7, wherein the assigning further comprises statically assigning the cellular identity upon registration in a SIP domain and based on a SIP user identity corresponding to the SIP-only device.

12. A method of handoff from a session initiation protocol (SIP) network to a CDMA network for a wireless device, comprising:
   determining whether a device is one of a SIP-only device operating with a SIP protocol and lacking a cellular identity or a hybrid device;
   authenticating the SIP-only device based on determining that the SIP-only device corresponds to a SIP user account of a SIP provider associated with the SIP-only device;
   assigning a cellular identity to the SIP-only device based on the authenticating, wherein the assigning further comprises selecting one of a defined number of cellular identities obtained from a cellular operator by the SIP provider associated with the SIP-only device;
   determining a handoff trigger has been triggered based in part on quality of a wireless device link; and
   tunneling SIP text within SMS messages to the CDMA network;
   wherein the assigning is performed dynamically upon attempting to originate a call to a cellular network by the SIP-only device.

13. The method of claim 12, further comprising granting access to a cellular network corresponding to the cellular operator using the cellular identity.

14. The method of claim 13, further comprising logging activities of the SIP-only device on the cellular network in the SIP user account.

15. The method of claim 13, wherein the access is granted without changes to the PHY layer or MAC layer operations of the SIP protocol.

16. The method of claim 12, wherein the assigning further comprises statically assigning the cellular identity upon registration in a SIP domain and based on a SIP user identity corresponding to the SIP-only device.

17. An apparatus, comprising:
   means for determining whether a device is one of a SIP-only device operating with a SIP protocol and lacking a cellular identity or a hybrid device;
   means for authenticating the SIP-only device based on determining that the SIP-only device corresponds to a SIP user account of a SIP provider associated with the SIP-only device; and
   means for assigning a cellular identity to the SIP-only device based on the authenticating, wherein the means for assigning further comprises means for selecting one of a defined number of cellular identities obtained from a cellular operator by the SIP provider associated with the SIP-only device;
   wherein the assigning is performed dynamically upon attempting to originate a call to a cellular network by the SIP-only device.

18. The apparatus of claim 17, further comprising means for granting access to a cellular network corresponding to the cellular operator using the cellular identity.

19. The apparatus of claim 18, further comprising means for logging activities of the SIP-only device on the cellular network in the SIP user account.

20. The apparatus of claim 18, wherein the access is granted without changes to the PHY layer or MAC layer operations of the SIP protocol.

21. The apparatus of claim 17, wherein the means for assigning further comprises means for statically assigning the cellular identity upon registration in a SIP domain and based on a SIP user identity corresponding to the SIP-only device.

22. The apparatus of claim 17, wherein the cellular identity is available for multiple calls.

23. A method of wireless communication, comprising:
upon determining that a device is a SIP-only device, operating with a SIP protocol and lacking a cellular identity, and is not a hybrid device, providing authentication information corresponding to the SIP-only device to a communication system,
wherein the authentication information is associated with a SIP user account of a SIP provider associated with the SIP-only device; and
receiving a cellular identity for the SIP-only device based on authentication of the authentication information, wherein the receiving further comprises receiving one of a defined number of cellular identities obtained from a cellular operator by the SIP provider associated with the SIP-only device;
wherein the cellular identity is received dynamically upon attempting to originate a call to a cellular network.

24. The method of claim 23, further comprising receiving access to a cellular network corresponding to the cellular operator using the cellular identity.

25. The method of claim 24, further comprising performing activities on the cellular network recordable to the SIP user account.

26. The method of claim 24, wherein the access is received without changes to the PHY layer or MAC layer operations of the SIP protocol.

27. The method of claim 23, wherein the receiving further comprises receiving a statically assigned cellular identity upon registration in a SIP domain and based on a SIP user identity corresponding to the SIP-only device.

28. The method of claim 23, wherein the cellular identity is available for multiple calls.

29. A wireless communication device, comprising:
means for providing, upon determining that the device is a SIP-only device, operating with a SIP protocol and lacking a cellular identity, and is not a hybrid device, authentication information corresponding to the SIP-only device to a communication system,
wherein the authentication information is associated with a SIP user account of a SIP provider associated with the SIP-only device; and
means for receiving a cellular identity for the SIP-only device based on authentication of the authentication information, wherein the receiving further comprises receiving one of a defined number of cellular identities obtained from a cellular operator by the SIP provider associated with the SIP-only device;
wherein the assigning is performed dynamically upon attempting to originate a call to a cellular network by the SIP-only device.

30. The device of claim 29, further comprising means for receiving access to a cellular network corresponding to the cellular operator using the cellular identity.

31. The method of claim 30, further comprising means for performing activities on the cellular network recordable to the SIP user account.

32. The device of claim 30, wherein the access is received without changes to the PHY layer or MAC layer operations of the SIP protocol.

33. The device of claim 29, wherein the means for receiving further comprises a statically assigned cellular identity upon registration in a SIP domain and based on a SIP user identity corresponding to the SIP-only device.

34. The wireless communication device of claim 29, wherein the cellular identity is available for multiple calls.

35. A non-transitory computer readable media embodying a program of instructions executable by a computer to perform a method of assigning a cellular identity to a session initiation protocol (SIP) device, comprising:
determining whether the device is one of a SIP-only device operating with a SIP protocol and lacking a cellular identity or a hybrid device;
authenticating the SIP-only device based on determining that the device is a SIP-only device and that the SIP-only device corresponds to a SIP user account of a SIP provider associated with the SIP-only device; and
assigning a cellular identity to the SIP-only device based on the authenticating, wherein the assigning further comprises selecting one of a defined number of cellular identities obtained from a cellular operator by the SIP provider associated with the SIP-only device;
wherein the assigning is performed dynamically upon attempting to originate a call to a cellular network by the SIP-only device.

36. The computer readable media of claim 35, further comprising instructions executable for granting access to a cellular network corresponding to the cellular operator using the cellular identity.

37. The computer readable media of claim 36, further comprising instructions executable for logging activities of the SIP-only device on the cellular network in the SIP user account.

38. The computer readable media of claim 36, wherein the access is granted without changes to the PHY layer or MAC layer operations of the SIP protocol.

39. The computer readable media of claim 35, wherein the instructions executable for assigning further comprise instructions executable for statically assigning the cellular identity upon registration in a SIP domain and based on a SIP user identity corresponding to the SIP-only device.

40. The computer readable media of claim 35, wherein the cellular identity is available for multiple calls.

41. An apparatus, comprising:
a memory comprising a non-transitory computer readable media embodying a program of instructions executable by a computer to perform a method of assigning a cellular identity to a session initiation protocol (SIP) device, comprising:
determining whether the device is one of a SIP-only device operating with a SIP protocol and lacking a cellular identity or a hybrid device;
authenticating the SIP-only device based on determining that the device is a SIP- only device and that the SIP-only device corresponds to a SIP user account of a SIP provider associated with the SIP-only device; and
assigning a cellular identity to the SIP-only device based on the authenticating, wherein the assigning further comprises selecting one of a defined number of cellular identities obtained from a cellular operator by the SIP provider associated with the SIP-only device;
wherein the assigning is performed dynamically upon attempting to originate a call to a cellular network by the SIP-only device; and
a processor operable to execute the program.

42. The apparatus of claim 41, wherein the memory further comprises instructions executable for granting access to a cellular network corresponding to the cellular operator using the cellular identity.

43. The apparatus of claim 42, wherein the memory further comprises instructions executable for logging activities of the SIP-only device on the cellular network in the SIP user account.

44. The apparatus of claim 42, wherein the access is granted without changes to the PHY layer or MAC layer operations of the SIP protocol.

45. The apparatus of claim 41, wherein the instructions for assigning further comprise instructions for statically assigning the cellular identity upon registration in a SIP domain and based on a SIP user identity corresponding to the SIP-only device.

46. The apparatus of claim 41, wherein the cellular identity is available for multiple calls.

47. A non-transitory computer readable media embodying a program of instructions executable by a computer to perform a method of wireless communication from a session initiation protocol (SIP) device to a CDMA network, comprising:
  determining whether a device is one of a SIP-only device operating with a SIP protocol and lacking a cellular identity or a hybrid device;
  authenticating the SIP-only device based on determining that the SIP-only device corresponds to a SIP user account of a SIP provider associated with the SIP-only device;
  assigning a cellular identity to the SIP-only device based on the authenticating, wherein the assigning further comprises selecting one of a defined number of cellular identities obtained from a cellular operator by the SIP provider associated with the SIP-only device; and
  tunneling SIP text within SMS messages to the CDMA network;
  wherein the assigning is performed dynamically upon attempting to originate a call to a cellular network by the SIP-only device.

48. The computer readable media of claim 47, further comprising instructions executable for granting access to a cellular network corresponding to the cellular operator using the cellular identity.

49. The computer readable media of claim 48, further comprising instructions executable for logging activities of the SIP-only device on the cellular network in the SIP user account.

50. The computer readable media of claim 48, wherein the access is granted without changes to the PHY layer or MAC layer operations of the SIP protocol.

51. The computer readable media of claim 47, wherein the instructions executable for assigning further comprise instructions executable for statically assigning the cellular identity upon registration in a SIP domain and based on a SIP user identity corresponding to the SIP-only device.

52. An apparatus, comprising:
  a memory comprising a non-transitory computer readable media embodying a program of instructions executable by a computer to perform a method of wireless communication from a session initiation protocol (SIP) device to a CDMA network, comprising:
    determining whether a device is one of a SIP-only device operating with a SIP protocol and lacking a cellular identity or a hybrid device;
    authenticating the SIP-only device based on determining that the SIP-only device corresponds to a SIP user account of a SIP provider associated with the SIP-only device;
    assigning a cellular identity to the SIP-only device based on the authenticating, wherein the assigning further comprises selecting one of a defined number of cellular identities obtained from a cellular operator by the SIP provider associated with the SIP-only device; and
    tunneling SIP text within SMS messages to the CDMA network;
    wherein the assigning is performed dynamically upon attempting to originate a call to a cellular network by the SIP-only device; and
  a processor operable to execute the program.

53. The apparatus of claim 52, wherein the memory further comprises instructions executable for granting access to a cellular network corresponding to the cellular operator using the cellular identity.

54. The apparatus of claim 53, wherein the memory further comprises instructions executable for logging activities of the SIP-only device on the cellular network in the SIP user account.

55. The apparatus of claim 53, wherein the access is granted without changes to the PHY layer or MAC layer operations of the SIP protocol.

56. The apparatus of claim 52, wherein the instructions executable for assigning further comprise instructions executable for statically assigning the cellular identity upon registration in a SIP domain and based on a SIP user identity corresponding to the SIP-only device.

57. A non-transitory computer readable media embodying a program of instructions executable by a computer to perform a method of handoff from a session initiation protocol (SIP) network to a CDMA network for a wireless device, comprising:
  determining whether a device is one of a SIP-only device operating with a SIP protocol and lacking a cellular identity or a hybrid device;
  authenticating the SIP-only device based on determining that the SIP-only device corresponds to a SIP user account of a SIP provider associated with the SIP-only device;
  assigning a cellular identity to the SIP-only device based on the authenticating, wherein the assigning further comprises selecting one of a defined number of cellular identities obtained from a cellular operator by the SIP provider associated with the SIP-only device;
  determining a handoff trigger has been triggered based in part on quality of a wireless device link; and
  tunneling SIP text within SMS messages to the CDMA network;
  wherein the assigning is performed dynamically upon attempting to originate a call to a cellular network by the SIP-only device.

58. The computer readable media of claim 57, further comprising instructions executable for granting access to a cellular network corresponding to the cellular operator using the cellular identity.

59. The computer readable media of claim 58, further comprising instructions executable for logging activities of the SIP-only device on the cellular network in the SIP user account.

60. The computer readable media of claim 58, wherein the access is granted without changes to the PHY layer or MAC layer operations of the SIP protocol.

61. The computer readable media of claim 57, wherein the instructions executable for assigning further comprise instructions executable for statically assigning the cellular identity upon registration in a SIP domain and based on a SIP user identity corresponding to the SIP-only device.

62. An apparatus, comprising:
a memory comprising a non-transitory computer readable media embodying a program of instructions executable by a computer to perform a method of handoff from a session initiation protocol (SIP) network to a CDMA network for a wireless device, comprising:
determining whether a device is one of a SIP-only device operating with a SIP protocol and lacking a cellular identity or a hybrid device;
authenticating the SIP-only device based on determining that the SIP-only device corresponds to a SIP user account of a SIP provider associated with the SIP-only device;
assigning a cellular identity to the SIP-only device based on the authenticating,
wherein the assigning further comprises selecting one of a defined number of cellular identities obtained from a cellular operator by the SIP provider associated with the SIP-only device;
determining a handoff trigger has been triggered based in part on quality of a wireless device link; and
tunneling SIP text within SMS messages to the CDMA network;
wherein the assigning is performed dynamically upon attempting to originate a call to a cellular network by the SIP-only device; and
a processor operable to execute the program.

63. The apparatus of claim 62, wherein the memory further comprises instructions executable for granting access to a cellular network corresponding to the cellular operator using the cellular identity.

64. The apparatus of claim 63, wherein the memory further comprises instructions executable for logging activities of the SIP-only device on the cellular network in the SIP user account.

65. The apparatus of claim 63, wherein the access is granted without changes to the PHY layer or MAC layer operations of the SIP protocol.

66. The apparatus of claim 62, wherein the instructions executable for assigning further comprise instructions executable for statically assigning the cellular identity upon registration in a SIP domain and based on a SIP user identity corresponding to the SIP-only device.

67. A non-transitory computer readable media embodying a program of instructions executable by a computer to perform a method of wireless communication, comprising:
upon determining that a device is a SIP-only device, operating with a SIP protocol and lacking a cellular identity, and is not a hybrid device, providing authentication information corresponding to the SIP-only device to a communication system,
wherein the authentication information is associated with a SIP user account of a SIP provider associated with the SIP-only device; and
receiving a cellular identity for the SIP-only device based on authentication of the authentication information, wherein the receiving further comprises receiving one of a defined number of cellular identities obtained from a cellular operator by the SIP provider associated with the SIP-only device;
wherein the cellular identity is received dynamically upon attempting to originate a call to a cellular network.

68. The computer readable media of claim 67, further comprising instructions executable for receiving access to a cellular network corresponding to the cellular operator using the cellular identity.

69. The computer readable media of claim 68, further comprising instructions executable for performing activities on the cellular network recordable to the SIP user account.

70. The computer readable media of claim 68, wherein the access is received without changes to the PHY layer or MAC layer operations of the SIP protocol.

71. The computer readable media of claim 67, wherein the instructions executable for receiving further comprise instructions executable for receiving a statically assigned cellular identity upon registration in a SIP domain and based on a SIP user identity corresponding to the SIP-only device.

72. The computer readable media of claim 67, wherein the cellular identity is available for multiple calls.

73. An apparatus, comprising:
a memory comprising a non-transitory computer readable media embodying a program of instructions executable by a computer to perform a method of wireless communication, comprising:
upon determining that a device is a SIP-only device, operating with a SIP protocol and lacking a cellular identity, and is not a hybrid device, providing authentication information corresponding to the SIP-only device to a communication system,
wherein the authentication information is associated with a SIP user account of a SIP provider associated with the SIP-only device; and
receiving a cellular identity for the SIP-only device based on authentication of the authentication information, wherein the receiving further comprises receiving one of a defined number of cellular identities obtained from a cellular operator by the SIP provider associated with the SIP-only device;
wherein the cellular identity is received dynamically upon attempting to originate a call to a cellular network; and
a processor operable to execute the program.

74. The apparatus of claim 73, wherein the memory further comprises instructions executable for receiving access to a cellular network corresponding to the cellular operator using the cellular identity.

75. The apparatus of claim 74, wherein the memory further comprises instructions executable for performing activities on the cellular network recordable to the SIP user account.

76. The apparatus of claim 74, wherein the access is received without changes to the PHY layer or MAC layer operations of the SIP protocol.

77. The apparatus of claim 73, wherein the instructions executable for receiving further comprise instructions executable for receiving a statically assigned cellular identity upon registration in a SIP domain and based on a SIP user identity corresponding to the SIP-only device.

78. The apparatus of claim 73, wherein the cellular identity is available for multiple calls.

* * * * *